(12) United States Patent
Owoeye et al.

(10) Patent No.: US 11,898,666 B1
(45) Date of Patent: Feb. 13, 2024

(54) HIGH TORQUE THREADED CONNECTIONS WITH TRIPLE TAPER THREAD PROFILES

(71) Applicant: SAUDI ARABIAN OIL COMPANY, Dhahran (SA)

(72) Inventors: Oladele Owoeye, Dhahran (SA); Jasem Moyaibed, Tarut (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/817,864

(22) Filed: Aug. 5, 2022

(51) Int. Cl.
    *F16L 15/06* (2006.01)
    *F16L 15/00* (2006.01)

(52) U.S. Cl.
    CPC .............. *F16L 15/06* (2013.01); *F16L 15/002* (2013.01)

(58) Field of Classification Search
    CPC ......... F16L 15/06; F16L 15/02; F16L 15/002; E21B 17/042
    See application file for complete search history.

(56) References Cited

U.S. PATENT DOCUMENTS

| | | | |
|---|---|---|---|
| 2,772,102 A | 11/1956 | Webb | |
| 3,994,516 A * | 11/1976 | Fredd | F16L 15/02 285/392 |
| 4,121,862 A * | 10/1978 | Greer | F16L 15/001 285/333 |
| 4,568,113 A * | 2/1986 | Axford | F16L 15/001 285/55 |
| 4,588,213 A * | 5/1986 | Bollfrass | F16L 15/004 285/333 |
| 4,662,659 A | 5/1987 | Blose et al. | |
| 4,893,844 A * | 1/1990 | Chelette | F16L 15/002 285/924 |
| 11,614,186 B1 * | 3/2023 | Sivley, IV | F16L 15/06 285/390 |
| 11,697,971 B2 * | 7/2023 | Campbell | F16L 15/06 285/334 |
| 2004/0017081 A1 | 1/2004 | Simpson et al. | |
| 2004/0251686 A1 | 12/2004 | Otten et al. | |
| 2015/0240570 A1 * | 8/2015 | Oku | F16L 15/06 285/334 |
| 2019/0128075 A1 * | 5/2019 | Urech | F16L 15/06 |
| 2019/0330930 A1 | 10/2019 | Oku et al. | |
| 2021/0033136 A1 * | 2/2021 | Garcha | F16L 5/06 |
| 2021/0317856 A1 | 10/2021 | Harvey et al. | |

FOREIGN PATENT DOCUMENTS

| | | |
|---|---|---|
| CN | 111448408 A | 7/2020 |
| WO | 2008116891 A1 | 10/2008 |
| WO | 2015099757 A1 | 7/2015 |

* cited by examiner

*Primary Examiner* — David Bochna
(74) *Attorney, Agent, or Firm* — Vorys, Sater, Seymour and Pease LLP

(57) ABSTRACT

A threaded connection includes a first tubular member having a pin end defining an external thread profile, and a second tubular member having a box end defining an internal thread profile threadably engageable with the external thread profile of the pin end. At least one of the external and internal thread profiles includes a first section that extends at a first taper angle relative to a longitudinal axis of the threaded connection, a second section extending from the first section at a second taper angle relative to the longitudinal axis, and a third section extending from the second section at a third taper angle relative to the longitudinal axis. The second taper angle is greater than each of the first and third taper angles.

20 Claims, 5 Drawing Sheets

US 11,898,666 B1

HIGH TORQUE THREADED CONNECTIONS WITH TRIPLE TAPER THREAD PROFILES

FIELD OF THE DISCLOSURE

The present disclosure relates generally to threaded pipes and, more particularly, to threaded connections between pin and box ends and having thread profiles exhibiting triple taper sections.

BACKGROUND OF THE DISCLOSURE

In the oil and gas industry, several types of tubing and pipe are used in exploration, completion, and production operations to extract hydrocarbons from subterranean hydrocarbon-bearing formations. Typical types of oilfield tubing include, among others, drill pipe, casing (or liner), and production tubing. Connected sections (lengths) of casing or liner pipe, for example, are used to encase the walls of a drilled wellbore and provide structural support for the well, and connected sections (lengths) of production pipe are used to convey the subsurface oil or gas to the well surface.

Wellbore pipe typically has a threaded end configuration specially designed to meet its intended purpose as it structurally secures and seals the pipe ends together. Common threaded connections include a male threaded member or "pin" at the end of a tubing section, which engages a female threaded member or "box" at the end of an adjoining tubing section. The box may be formed as an integral part of the tubing section or it may comprise a coupling secured to a pin end of a tubular pipe section.

Threaded connections of oilfield pipe and tubulars generally engage each other in an interference fit, a shouldering fit, or a combination of interference and shouldering fits. In an interference fit, tapered pin and box ends are tightly wedged together as the pin threadably advances into the box. The resulting interference fit provides both structural and sealing connections between the pin and box ends. In contrast, a shouldering connection engages an annular shoulder on the pin end with an annular shoulder provided on the box end. The threads of the shouldering connection provide the structure holding the pin and box ends together, and the engaged shoulders help facilitate a sealed engagement.

Threaded connections tend to fail in areas of stress concentrations that occur during makeup and working of the connections. In particular, threaded connections can often exceed compression limits during deployment and production. A variety of thread designs, forms, and profiles have been suggested and introduced to change the distribution of torque stresses along the threaded connections of oilfield tubing, and thereby improve the long-term pipe integrity.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a threaded connection may include a first tubular member having a pin end defining an external thread profile, and a second tubular member having a box end defining an internal thread profile threadably engageable with the external thread profile of the pin end, wherein at least one of the external and internal thread profiles may include a first section that extends at a first taper angle relative to a longitudinal axis of the threaded connection, a second section extending from the first section at a second taper angle relative to the longitudinal axis, and a third section extending from the second section at a third taper angle relative to the longitudinal axis, wherein the second taper angle is greater than each of the first and third taper angles.

According to one or more additional embodiments consistent with the present disclosure, a thread profile for a tubular member may include a first section that extends from an end of the thread profile at a first taper angle relative to a longitudinal axis of the tubular member, a second section extending from the first section at a second taper angle relative to the longitudinal axis, and a third section extending from the second section at a third taper angle relative to the longitudinal axis, wherein the second taper angle is greater than each of the first and third taper angles.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
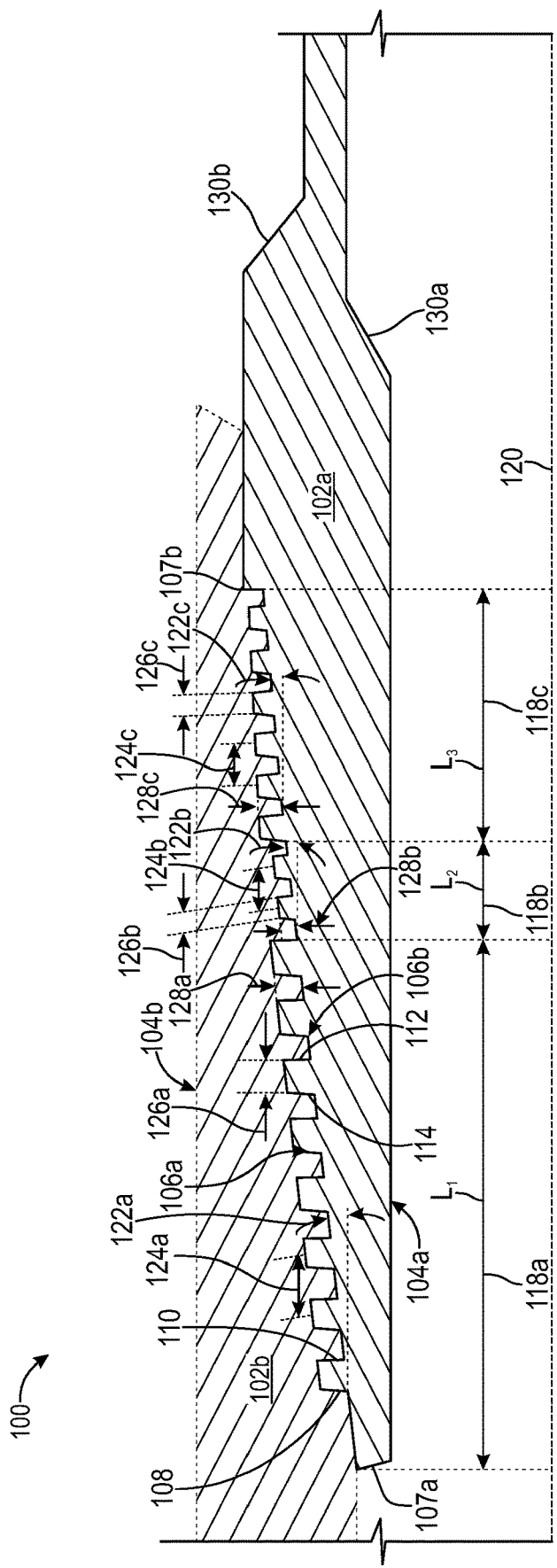
FIG. 1 is a cross-sectional side view of an example threaded connection that may incorporate the principles of the present disclosure.

Embodiments of the present disclosure will now be described in detail with reference to the accompanying Figures. Wherever possible, like or identical reference numerals are used in the figures to identify common or the same elements. The figures are not necessarily to scale and certain features and certain views of the figures may be shown exaggerated in scale for purposes of clarification. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description.

Embodiments in accordance with the present disclosure generally relate to threaded connections that include a first tubular member having a pin end defining an external thread profile, and a second tubular member having a box end defining an internal thread profile threadably engageable with the external thread profile of the pin end. At least one of the external and internal thread profiles includes a first section that extends at a first taper angle relative to a longitudinal axis of the threaded connection, a second section extending from the first section at a second taper angle relative to the longitudinal axis, and a third section extending from the second section at a third taper angle relative to the longitudinal axis. Other possible combinations are not limited to the first taper angle being steeper than the second taper angle or with both the second and third taper angles being the same.

FIG. 1 is a cross-sectional side view of an example threaded connection 100 that may incorporate the principles of the present disclosure. The threaded connection 100 (also referred to as a "tool joint") may form part of a string of multiple pipes (alternately referred to herein as "tubulars," "tubular members," or "tubes") threadably connected together end-to-end. As illustrated, the threaded connection 100 may include a pin end or "pin" 102a of a first tubular member 104a and a box end or "box" 102b (shown in dashed lines) of a second tubular member 104b (shown in dashed lines). The first and second tubular members 104a,b may comprise any type of tubing, pipe, or tubulars commonly used in the oil and gas industry and capable of being threadably connected end-to-end. Examples of the tubular members 104a,b include, but are not limited to, drill pipe, casing (or liner), production tubing, general tubular assemblies (e.g., a wellbore hanger, hydraulic fracturing tools, float equipment, etc.), and any combination thereof. In at least one embodiment, the tubular members 104a,b may exhibit an external diameter of 5.5 inches or less, but could alternatively exhibit a diameter greater than 5.5 inches, without departing from the scope of the disclosure.

During operation, it is desirable that the threaded connection 100 have sufficient strength to withstand all expected service loads (e.g., torsion, tension, compression, etc.). Particularly, it is desirable that the threaded connection 100 have sufficient torsional strength, which is a measure of the amount of torque applied about the centerline of the threaded connection 100 required to cause failure. In order to optimize the torsional strength of the threaded connection 100, the threads must be designed to have a sufficient bearing and shear strength to avoid the common failures resulting from elevated torsion. Bearing strength is a measure of the amount of force required to cause deformation (e.g., plastic deformation) of engaged surfaces (e.g., thread flanks) of the threaded connection 100, and shear strength is a measure of the amount of force required to shear the threads between the thread flanks along a plane substantially parallel to the connection centerline. It is also desirable that the threaded connection 100 provide a gas-tight seal for the conveyance or preservation of gaseous hydrocarbons.

In the illustrated embodiment, the threaded connection 100 comprises an interference connection. In other embodiments, however, the threaded connection 100 may alternatively comprise a shouldered connection, or a combination shouldered and interference connection, without departing from the scope of the disclosure.

As illustrated, the pin 102a defines or otherwise provides a helically extending external thread profile 106a threadably engageable with a helically extending internal thread profile 106b defined or otherwise provided by the box 102b. The external thread profile 106a includes a first or "distal" end 107a at or near the distal end of the pin 102a, and a second or "proximal" end 107b. Each tooth of the external thread profile 106a includes a stab flank 108 and a load flank 110, and each tooth of the internal thread profile 106b similarly includes a stab flank 112 and a load flank 114. As the threaded connection 110 is made up (e.g., coupled together), the stab flanks 108, 112 oppose each other, and the load flanks 110, 114 oppose each other.

As used herein, the term "thread profile" refers to the thread form or configuration of a thread in an axial plane and which is generally considered to include a crest, a root, and opposing stab and load flanks. The term "stab flank" is intended to designate those flanks of the pin and box threads that first engage as the pin 102a is stabbed into the box 102b, and the term "load flank" is intended to designate those contacting flanks of the pin and box threads that normally contact with an increasing bearing pressure in reaction to the load forces tending to separate the engaged pin 102a and box 102b axially.

Although not visible in FIG. 1, any gap between succeeding turns of the external and internal thread profiles 106a,b will progressively diminish, and the interference will increase between engaged threads after the gap closes in a direction toward the distal end of the pin 102a. Moreover, as torque is applied to the threaded connection 100, the pin 102a will be drawn in tension and the box 102b will be pulled in compression.

It is contemplated herein to match the internal thread profile 106b of the box 102b to the external thread profile 106a of the pin 102a such that the threaded connection 100 exhibits optimized torsional strength and a gas-tight seal. Accordingly, the following discussion corresponds to the external thread profile 106a of the pin 102a, but is equally applicable to the internal thread profile 106b of the box 102b.

In the illustrated embodiment, the external thread profile 106a provides and otherwise defines a first or "nose" section 118a, a second or "transition" section 118b, and a third or "stress bearing" section 118c, where the nose, transition, and stress bearing sections 118a-c collectively form the thread profile 106a and extend contiguously in succession along the axial length of the thread profile 106a. Accordingly, the transition section 118b axially interposes the nose and stress bearing sections 118a,c. As described herein, the differences in the nose, transition, and stress bearing sections 118a-c may prove advantageous in easing the process of stabbing the pin 102a into the box 102b, as well as resulting in improved alignment and torsional capacity.

The nose section 118a extends or otherwise exhibits a first length $L_1$, the transition section 118b extends a second length $L_2$ from the nose section 118a, and the stress bearing section 118c extends a third length $L_3$ from the transition section 118b. In some embodiments, the first, second and third lengths $L_1$, $L_2$, $L_3$ may be the same; e.g., $L_1=L_2=L_3$. In other embodiments, however, one or more of the first, second, and third lengths $L_1$, $L_2$, $L_3$ may be different from one or more of the other first, second and third lengths $L_1$, $L_2$, $L_3$. In the illustrated example, for instance, the first length $L_1$ is greater than the second and third lengths, $L_2$, $L_3$, and the third length $L_3$ is greater than the second length $L_2$; e.g., $L_1>L_3>L_2$. In other embodiments, however, the second length $L_2$ may be greater than one or both of the first and third lengths $L_1$, $L_3$, without departing from the scope of the disclosure. Those skilled in the art will readily appreciate that the magnitude of each length $L_1$, $L_2$, $L_3$ may be modified to meet specifications of particular applications.

The nose section 118a extends at a first taper angle 122a relative to a longitudinal axis 120 of the threaded connection 100, the transition section 118b extends at a second taper angle 122b relative to the longitudinal axis 120, and the stress bearing section 118c extends at a third taper angle 122c relative to the longitudinal axis 120. In some embodiments, the taper angles 122a-c may each be the same. In such embodiments, the cross-sectional area of the pin 102a will progressively increase at a constant rate across each section 118a-c from the distal end 107a toward the proximal end 107b of the external thread profile 106a.

In other embodiments, however, one or more of the taper angles 122a-c may differ from one or more of the other taper angles 122a-c. In the illustrated example of FIG. 1, for instance, the first taper angle 122a is less than the second taper angle 122b, but is greater than the third taper angle 122c; e.g., 122c<122a<122b. Having the second taper angle 122b greater than the first taper angle 122a results in increased cross-sectional area across the transition section 118b, while simultaneously resulting in reduced contact force during make-up of the threaded connection 100. The steeper angle of the second taper angle 122b can help the pin 102a dive into the box 102b with the least need for rotation to reach the final make-up position. Moreover, the reduced contact force during make-up is largely due to the reduction in the height of the crest of the thread form in the transition section 118b. As will be appreciated, however, other variations in the taper angles 122a-c may be provided, without departing from the scope of the disclosure.

The thread profile 106a across each section 118a-c may provide the same or different thread pitches, where "thread pitch" is defined as the distance between corresponding points on axially adjacent threads of the thread profile 106a. More specifically, the nose section 118a provides a first thread pitch 124a, the transition section 118b provides a second thread pitch 124b, and the stress bearing section 118c provides a third thread pitch 124c. In some embodiments, the thread pitches 124a-c may be the same along the entire length of the thread profile 106a. In other embodiments, however, one or more of the thread pitches 124a-c may differ from one or more of the other thread pitches 124a-c. Accordingly, the thread profile 106a may exhibit single, double, or triple thread pitches 124a-c along its axial length.

In the illustrated example of FIG. 1, the first thread pitch 124a is greater than both the second and third thread pitches 124b,c; e.g., 124a>124b and 124c. In this example, the second and third thread pitches 124b,c may be the same, but could alternatively be different. Accordingly, the first thread pitch 124a may be more coarse as compared to the second and third thread pitches 124b,c, which may prove advantageous in reducing the risk of cross-threading with the box 102b during the connection make-up process. This may also provide enhanced torque capacity due to the increased cross-sectional area of the stress bearing section 118c, and the increased torsional strength of the threaded connection 100 ensures improved performance during deployment in challenging well conditions, such as deep wells, horizontal wells, long reach wells, etc.

In other embodiments, the first and third thread pitches 124a,c may be the same, but different from the second thread pitch 124b. In such embodiments, the second thread pitch 124b may be greater than or less than the first and third thread pitches 124a,c, without departing from the scope of the disclosure.

The external thread profile 106a across each section 118a-c may further provide the same or different crest widths, where "crest" is defined as the prominent (or outermost) part of the thread profile 106a, and the "crest width" refers to the axial width of a particular thread at any given point along the thread profile 106a. The threads of the thread profile 106a provided in the nose section 118a provide a first crest width 126a, the threads provided in the transition section 118b provide a second crest width 126b, and the threads provided in the stress bearing section 118c provide a third crest width 126c.

In some embodiments, the crest widths 126a-c may be the same along the entire length of the thread profile 106a. In other embodiments, however, one or more of the crest widths 126a-c may differ from one or more of the other crest widths 126a-c. In the illustrated example of FIG. 1, for instance, the first crest width 126a is greater than both the second and third crest widths 126b,c, and the third crest width 126c is greater than the second crest width 126c; e.g., 126a>126c>126b. Alternatively, the first and third crest widths 126a,c may be the same and greater than the second crest width 126b; e.g., 126a=126c>126b.

The thread profile 106a across each section 118a-c may further provide the same or different thread height, where "thread height" is defined as the distance between the crest and the root of a given thread of the thread profile 106a. More specifically, the threads of the thread profile 106a provided in the nose section 118a provide a first thread height 128a, the threads provided in the transition section 118b provide a second thread height 128b, and the threads provided in the stress bearing section 118c provide a third thread height 128c. In some embodiments, the thread heights 128a-c may be the same along the entire length of the thread profile 106a. In other embodiments, however, one or more of the thread heights 128a-c may differ from one or more of the other thread heights 128a-c. In the illustrated example of FIG. 1, for instance, the second thread height 128b is less than both the first and third thread heights 128a,c; e.g., 128b<126a and 126c. In this example, the first and third thread heights 128a,c may be the same, but could alternatively be different.

The combination of a smaller or larger crest width 126b and a smaller thread height 128b in the transition section 118b, as compared to the crest widths 126a,c and thread heights 128a,c in the nose and stress bearing sections 118a,c, respectively, may help reduce or eliminate stress in the transition section 118b during and after the make-up process of the threaded connection 100. As further explanation, the transition section 118b with a reduced thread height or stubbed thread acts as a seating zone or landing pad during the make-up process by allowing the pin 102a to travel directly to that zone while stabbing and prior to commencement of making-up. In addition, the reduced thread height in this zone results in reduced contact force and stress during and post connection make-up process. Moreover, this may improve the alignment of the threaded connection 100 during the make-up process, thus reducing the risk of cross-threading of the opposing external and internal thread profiles 106a,b. More particularly, the transition section 118b essentially acts as a seating zone, where the pin 102a will travel directly to that section 118b while stabbing and before the start of making-up, which can help the alignment of the threaded connection 100 and potentially reduce the risk of cross-threading. The stubbed thread in the transition section 118b with the multi-taper allows for deeper stabbing in comparison to shallow tapered alternatives. In addition, the seating zone resulting from the reduced thread height in the transition section 118b enables self-alignment of the connection during the stabbing and make up process.

As indicated above, the foregoing discussion related to the external thread profile 106a of the pin 102a is equally applicable to the internal thread profile 106b of the box 102b. Consequently, the internal thread profile 106b may also include a triple tapered profile that matches the triple tapered internal thread profile 106a. More specifically, the internal thread profile 106b may include a first or "distal" end, a second or "proximal" end opposite the distal end, a first section that exhibits a first taper (or taper angle), a second section that exhibits a second taper (or taper angle), and a third section that exhibits a third taper (or taper angle). The pitch(es) 124a-c used on the pin 102a may generally match corresponding pitch(es) of the box 102b across the corresponding sections of the profiles 106a,b. Moreover, in at least one embodiment, the second section of the internal thread profile 106b in combination with the transition section 118b of the external thread profile 106a may help facilitate self-alignment of the threaded connection 100.

In some embodiments, as illustrated, the pin 102a of the threaded connection 100 may further include a first or "internal" upset 130a and a second or "external" upset 130b. The upsets 130a,b increase the cross-sectional area of the threaded connection 100, which helps improve the torsional capacity and ensures the tensile capacity exceeds the tensile capacity of the body of the first tubular 104a. The upsets 130a,b may also help to provide and otherwise ensure that there will be sufficient material to develop the three-taper structure described herein.

Figure 2:
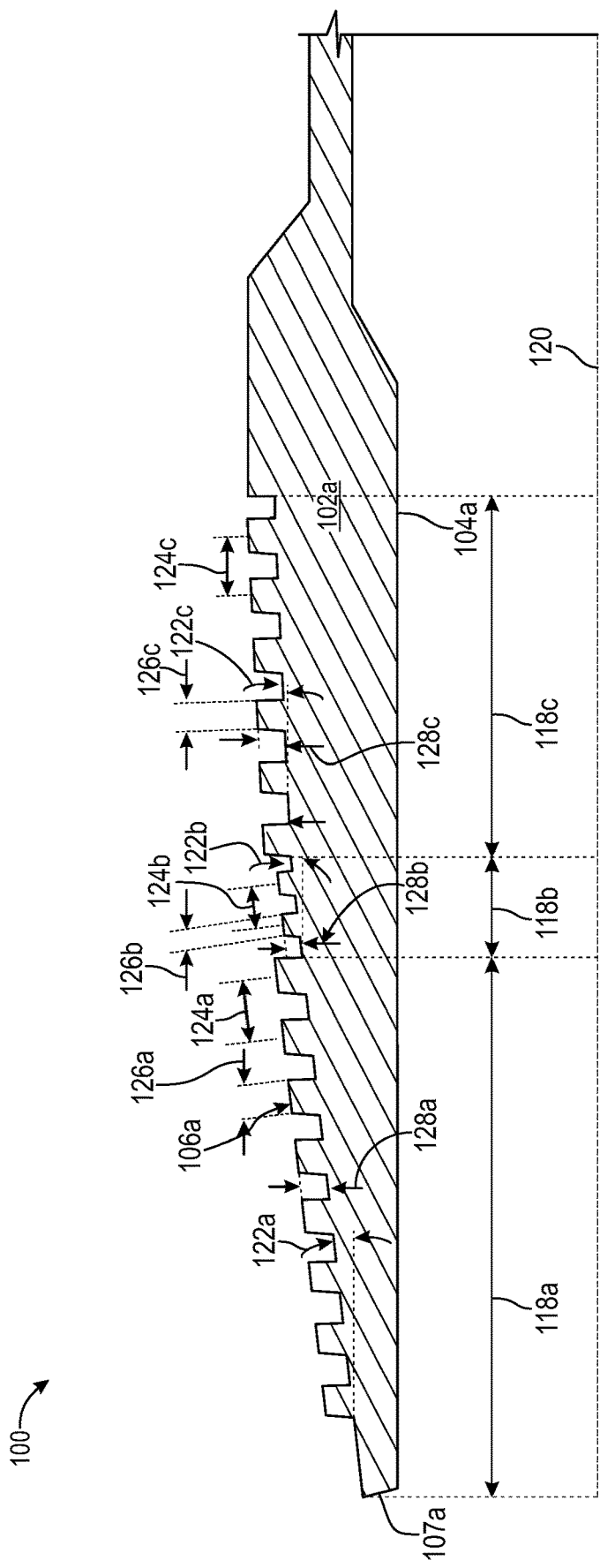
FIG. 2 is a cross-sectional side view of another example embodiment of the pin of the first tubular member of FIG. 1, according to one or more additional embodiments.

FIG. 2 is a cross-sectional side view of another example embodiment of the pin 102a of the first tubular member 104a, according to one or more additional embodiments. More particularly, FIG. 2 depicts an alternative embodiment for the external profile 106a of the pin 102a. In the illustrated embodiment, the first taper angle 122a of the nose section 118a is greater than the second taper angle 122b of the transition section 118b, and the second taper angle 122b is greater than the third taper angle 122c of the stress bearing section 118c; e.g., 122a>122b>122c. In such embodiments, the cross-sectional area of the pin 102a will progressively increase from the distal end 107a toward the proximal end 107b, but the rate of increase will decrease across subsequent sections 118b,c.

In other embodiments, however, the first taper angle 122a may be greater than the second taper angle 122b, and the second taper angle 122b may be the same as the third taper angle 122c; e.g., 122a>122b=122c. In embodiments where the first taper angle 122a is greater than the second and third taper angles 122b,c, the stab-in process of the threaded connection 100 (FIG. 1) may be undertaken with increased ease in contrast to applications where the first taper angle 122a is smaller than the second and/or third taper angles 122b,c.

In the illustrated embodiment, the first, second, and third thread pitches 124a-c are the same; e.g., 124a=124b=124c, but could alternatively be different, as discussed above. Moreover, in the illustrated embodiment, the first, second, and third crest widths 126a-c are the same; e.g., 126a=126b=126c, but could alternatively be different, as discussed above. Furthermore, in the illustrated embodiment, the first, second, and third thread heights 128a-c are the same; e.g., 128a=128b=128c, but could alternatively be different, as discussed above.

Figure 3:
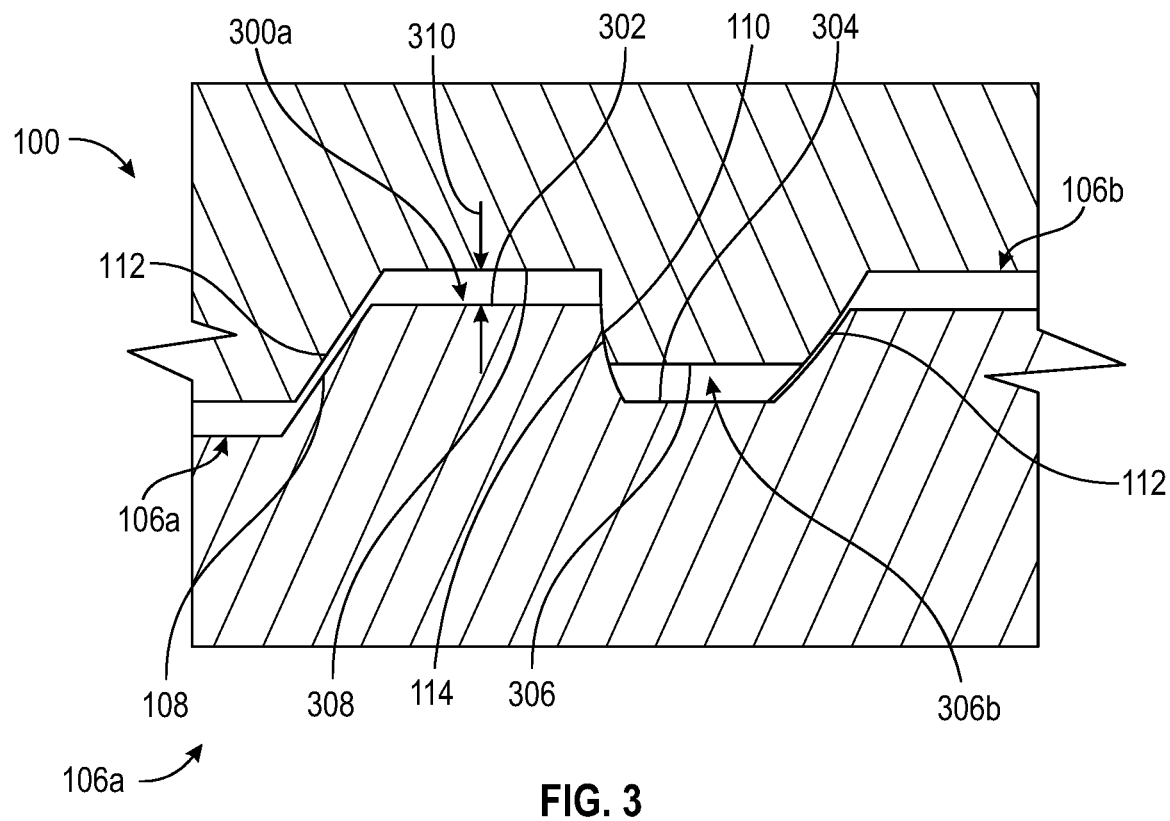
FIG. 3 is an enlarged cross-sectional view of a portion of the threaded connection of FIG. 1, according to one or more embodiments.

FIG. 3 is an enlarged cross-sectional view of a portion of the threaded connection 100 of FIG. 1, according to one or more embodiments. As illustrated, the external thread profile 106a provides a first tooth 300a that defines a crest 302 and a root 304, and the stab and load flanks 108, 110 extend between the crest 302 and the root 304. Similarly, the internal thread profile 106b provides a second tooth 300b that defines a crest 306 and a root 308, and the stab and load flanks 112, 114 extend between the crest 306 and the root 308. As the threaded connection 110 is made up, the stab flanks 108, 112 oppose each other, and the load flanks 110, 114 oppose each other. In some embodiments, the crest 302 and the root 304 of the first tooth 300a define substantially flat surfaces that are generally parallel to one another, and the crest 306 and the root 308 of the second tooth 300b define substantially flat surfaces that are generally parallel to one another.

As illustrated, a gap 310 may be defined between the crest 302 of the first tooth 300a and the root 308 of the second tooth 300b, which reduces contact force during the make-up process of the threaded connection 100. This may prove advantageous in providing an anti-galling characteristic and otherwise mitigating galling between the thread profiles 106a,b. This may result in a reduction of contact forces in the nose and stress bearing sections 118a,c (FIGS. 1 and 2) with minimal to no contact stress in the transition section 118b (FIGS. 1 and 2).

Figure 4:
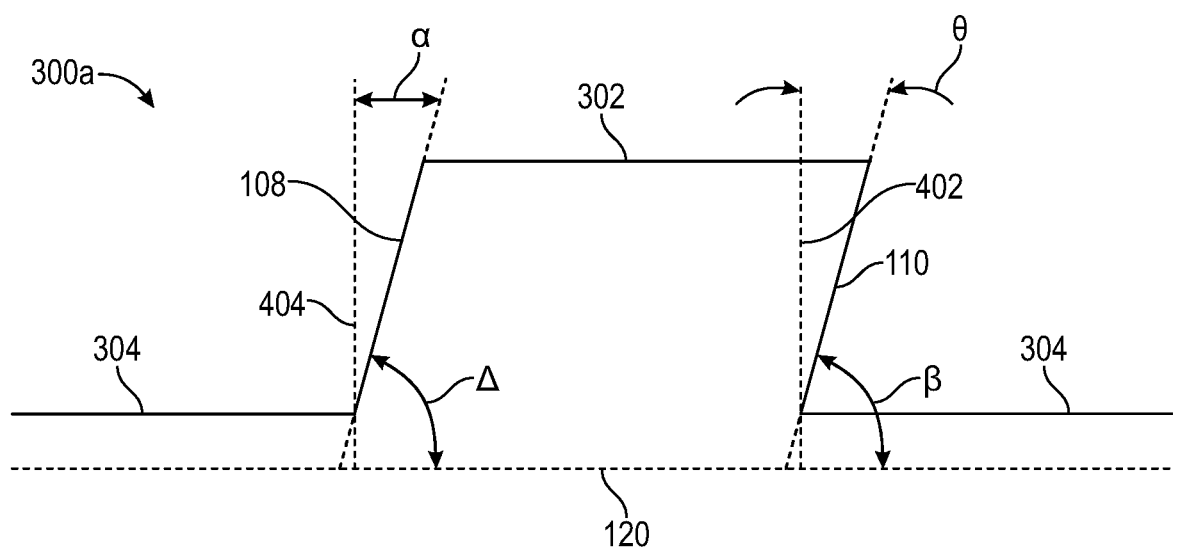
FIG. 4 is an enlarged schematic view of an example of the first tooth of FIG. 3, according to one or more embodiments.

FIG. 4 is an enlarged schematic view of an example of the first tooth 300a of FIG. 3, according to one or more embodiments. As illustrated, the first tooth 300a provides the crest 302, the root 304, and the opposing stab and load flanks 108, 110 that extend between the crest 302 and the root 304. In some embodiments, the geometry of the tooth 300a, and therefore the overall geometry of the external thread profile 106a (FIGS. 1 and 2), may be modified to reduce the risk of thread "jump out" under increased tensile load or excessive torque during the connection make-up process. Thread jump out is a connection failure mode resulting from the formation of a gap between the thread flanks, and can promote the total separation of the tubular string. It can occur as a result of excessive torque during make-up or improper make-up, and the risk of thread jump out increases with increasing tension.

More specifically, the thread form has been optimized with a load flank 110 which may extend at an angle β from the longitudinal axis 120 of the threaded connection 100 (FIG. 1), where the angle β is about 85°. Expressed differently, the load flank 110 may extend at an angle θ measured relative to a line 402 perpendicular to the longitudinal axis 120, and the angle θ may be about −5°. In at least one embodiment, the angle θ may range between about −4.5° and −5.5° (e.g., the angle β ranging between 85.5° and 84.5°), without departing from the scope of the disclosure. The negative load flank angle θ may prove advantageous in helping to reduce the relative sliding and radial separation between the threaded connection 100, which ultimately results in thread jump out under tensile load. The tensile load on the connection 100 could be made worse with poor or improper connection make-up process resulting in less thread engagement or over torqued connection resulting in plastic deformation of some thread form, which also ultimately results in reduced thread engagement and increased load on the engaged threads. Furthermore, the load flank angle β or θ has a direct relationship with the possible location of stress concentrators on the engaging load flanks during the connection make up process. The negative load flank angle θ design may be able to redirect the stress concentrators towards the lower portion of the pin thread with more tensile strength further reducing the risk of connection failure.

In some embodiments the first tooth 300a may be located in the nose or stress bearing sections 118a or 118c (FIGS. 1 and 2), and having the load flank 110 extend at the angle β (or alternatively the angle θ) may help improve tensile capacity, reduce relative sliding and radial separation between the pin 102a (FIGS. 1 and 2) and the box 102b (FIGS. 1 and 2), which minimizes the risk of thread jump-out.

In other embodiments, however, or in addition thereto, the first tooth 300a may be located in the transition section 118 (FIGS. 1 and 2). In such embodiments, the load flank angle θ may be −5° (with tolerance of +0.5° to −0.5°). Moreover, in such embodiments, the stab flank 108 may extend at an angle Δ from the longitudinal axis 120 of the threaded connection 100 (FIG. 1), where the angle Δ is about 80°. Expressed differently, the stab flank 108 may extend at an angle α measured relative to a line perpendicular 404 to the longitudinal axis 120, and the angle α may be about +10°. The stab flank angle Δ or α may help improve the efficiency of the connection make-up process.

Figure 5:
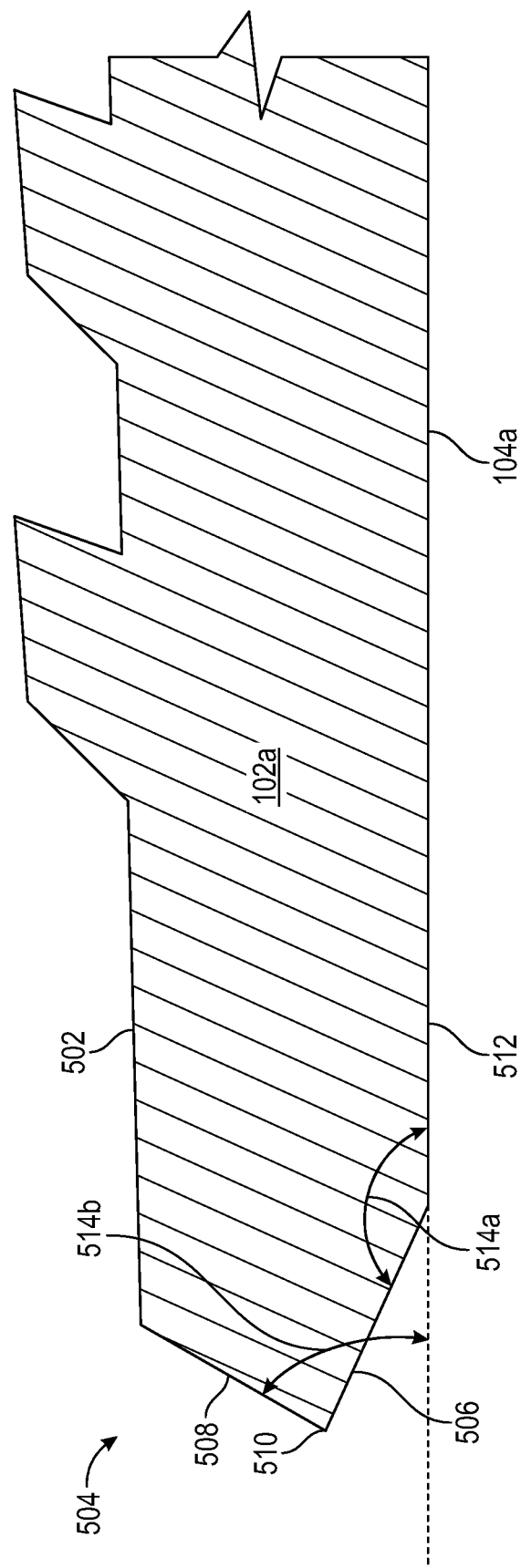
FIG. 5 is an enlarged cross-sectional view of the pin of the first tubular member of FIG. 1, according to one or more embodiments.

FIG. 5 is an enlarged cross-sectional view of a portion of the pin 102a of the first tubular member 104a, according to one or more embodiments. As illustrated, the pin 102a provides an extended lip 502 that terminates in a distal end 504, which forms the distal end of the pin 102a. The distal end 504 may be configured to axially engage a load shoulder (not shown) of an opposing box (e.g., the box 102b of FIG. 1) and thereby provide a metal-to-metal seal at the distal end 504.

In some embodiments, as illustrated, the distal end 504 provides and otherwise defines a reverse angle portion 506 and a chamfer portion 508 that meet at a common midpoint 510. The reverse angle portion 506 extends from an inner surface 512 of the pin 102a at a first angle 514a and terminates at the midpoint 510. In some embodiments, the first angle 514a may be about 1650 (e.g., 150 reverse angle) from the inner surface 512. The reverse angle portion 506 helps provide a positive contact with an opposing load shoulder of a box (e.g., the box 102b of FIG. 1), which helps improve compression efficiency.

The chamfer portion 508 extends from the midpoint 510 at a second angle 514b measured from the inner surface 512. In some embodiments, the second angle 514b may be about 450 from the inner surface 512. The chamfer portion 508 may help improve stabbing during the connection make-up process. The combination of the reverse angle portion 506 and the chamfer portion 508 help facilitate a metal-to-metal seal with the opposing load shoulder of a box (e.g., the box 102b of FIG. 1), and further improve compression efficiency and sealing capabilities.

Figure 6:
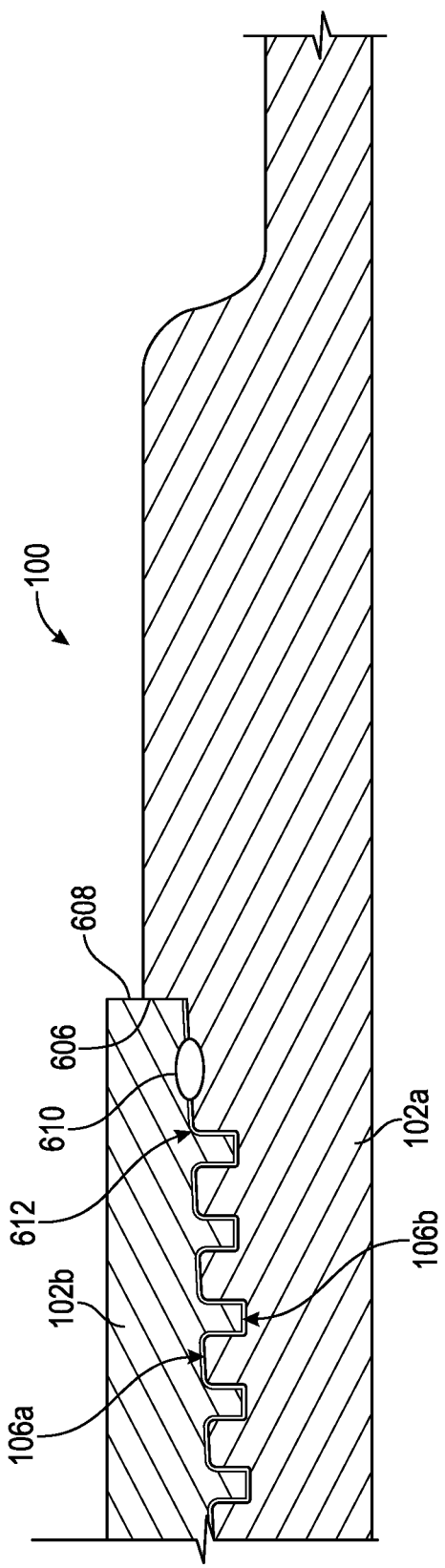
FIG. 6 is an enlarged, cross-sectional view of a portion of the threaded connection of FIG. 1, according to one or more embodiments.

FIG. 6 is an enlarged, cross-sectional view of a portion of the threaded connection 100 of FIG. 1, according to one or more embodiments. In the illustrated embodiment, the threaded connection 100 comprises a shouldered connection. As illustrated, the pin 102a includes an external shoulder 606 engageable with and end face 608 of the box 102b. In operation, the end face 608 functions as a box shoulder engaging the external pin shoulder 606. In some embodiments, the primary sealing mechanism between the pin 102a and the box 102b is a metal-to-metal seal formed between the opposing external and internal thread profiles 106a,b in combination with the axial engagement between the external shoulder 606 and the end face 608. The metal-to-metal seal acts as a primary gas-tight sealing system for the threaded connection 100. The metal-to-metal seal generated by the axial engagement between the external shoulder 606 and the end face 608 is characterized as an external pressure seal.

In some embodiments, however, the threaded connection 100 may further include a secondary seal that operates as an external seal or another metal-to-metal seal that functions as an external seal. In at least one embodiment, the secondary seal may include or otherwise comprise a resilient seal 610, which may comprise a seal ring. In the illustrated embodiment, the resilient seal 610 may be arranged between the external and internal thread profiles 106a,b at or near the interface between the external shoulder 606 and the end face 608. For example, the resilient seal 610 may be positioned at the stress contact area around the last engaged thread 612 of the threaded connection 100. The thread groove where the resilient seal 610 is positioned may exhibit sufficient tolerances to generate an interference fit with or without the volumetric strain of the resilient seal 610, where applicable.

The resilient seal 610 may be made of a variety of pliable materials including, but not limited to, a polymer and an elastomer. In some embodiments, the resilient seal 610 may be made of a material that is water swellable, but may alternatively be made of a non-water swellable seal material, depending on the application.

Figure 7:
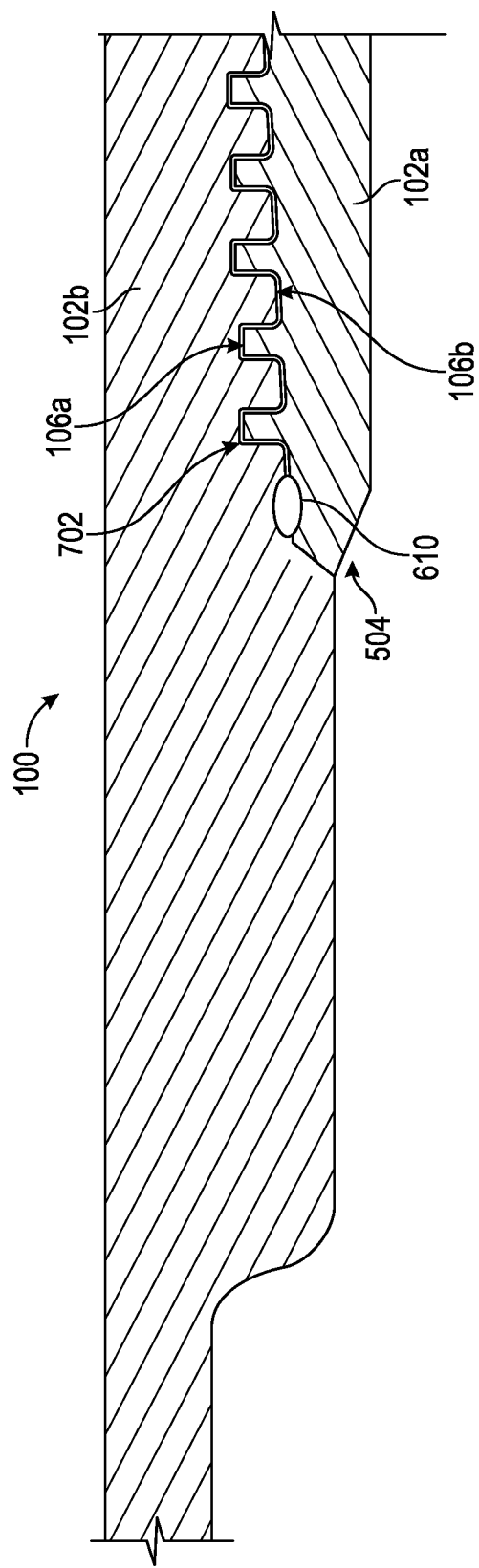
FIG. 7 is another enlarged, cross-sectional view of a portion of the threaded connection of FIG. 1, according to one or more additional embodiments.

FIG. 7 is another enlarged, cross-sectional view of a portion of the threaded connection 100 of FIG. 1, according to one or more embodiments. More specifically, FIG. 7 is an enlarged view of the distal end 504 of the pin 102a as engaged with the box 102b. In the illustrated embodiment, the resilient seal 610 is arranged at or near an initial engaged thread 702 of the external thread profile 106a, and located before the primary metal-to-metal seal area between the opposing external and internal thread profiles 106a,b.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof. As used herein, the term "coupled" or "coupled to" or "connected" or "connected to" or "attached" or "attached to" may indicate establishing either a direct or indirect connection, and is not limited to either unless expressly referenced as such.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

The invention claimed is:

1. A threaded connection, comprising:
    a first tubular member having a pin end defining an external thread profile; and
    a second tubular member having a box end defining an internal thread profile threadably engageable with the external thread profile of the pin end, wherein at least one of the external and internal thread profiles includes:
        a first section that extends at a first taper angle relative to a longitudinal axis of the threaded connection and exhibits a first thread pitch;
        a second section extending from the first section at a second taper angle relative to the longitudinal axis and exhibits a second thread pitch; and
        a third section extending from the second section at a third taper angle relative to the longitudinal axis and exhibits a third thread pitch, wherein the second taper angle is greater than each of the first and third taper angles.

2. The threaded connection of claim 1, wherein at least one of the first, second, and third thread pitches is different from at least one other of the first, second and third thread pitches.

3. The threaded connection of claim 2, wherein the first thread pitch is greater than the each of the second and third thread pitches.

4. The threaded connection of claim 2, wherein the second thread pitch is greater than the each of the first and third thread pitches.

5. The threaded connection of claim 1, wherein the first section exhibits a first crest width, the second section exhibits a second crest width, and the third section exhibits a third crest width, and wherein the first crest width is greater than the third crest width, and the third crest width is greater than the second crest width.

6. The threaded connection of claim 1, wherein the first section exhibits a first thread height, the second section exhibits a second thread height, and the third section exhibits a third thread height, and wherein the second thread height is less than both the first and third thread heights.

7. The threaded connection of claim 1, wherein at least one of the pin end and the box end provides an internal upset and an external upset.

8. The threaded connection of claim 1, wherein the external thread profile provides a first tooth that defines a crest, and the internal thread profile provides a second tooth that defines a root that opposes the crest, and wherein a gap is defined between the crest and the root and thereby reduces contact forces.

9. The threaded connection of claim 1, wherein the at least one of the external and internal thread profiles further includes a tooth that provides a crest, a root, and opposing stab and load flanks that extend between the crest and the root, and wherein the load flank extends at an angle of about 85° from the longitudinal axis.

10. The threaded connection of claim 9, wherein the tooth is located in the second section and the stab flank extends at an angle of about 80° from the longitudinal axis.

11. The threaded connection of claim 1, wherein the pin end provides an extended lip that terminates in a distal end, and the distal end provides:
    a reverse angle portion that extends from an inner surface of the pin end at a first angle and terminates at a midpoint; and
    a chamfer portion that extends from the midpoint at a second angle measured from the inner surface.

12. The threaded connection of claim 11, wherein the first angle is about 165° from the inner surface, and wherein the second angle is about 45° from the inner surface.

13. The threaded connection of claim 1, wherein a proximal end of the external thread profile terminates in an external shoulder and a proximal end of the internal thread profile terminates in an end face engageable with the external shoulder to facilitate a metal-to-metal seal.

14. The threaded connection of claim 13, further comprising a resilient seal arranged between the external and internal thread profiles and positioned near a last engaged thread of the threaded connection.

15. The threaded connection of claim 14, wherein the resilient seal is made of a water swellable material.

16. The threaded connection of claim 1, further comprising a resilient seal arranged between the external and internal thread profiles and positioned near an initial engaged thread at a distal end of the internal thread profile.

17. The threaded connection of claim 16, wherein the length of the third section is greater than the length of the second section.

18. The threaded connection of claim 1, wherein a length of the first section is greater than each of a length of the second section and a length of the third section.

19. A thread profile for a tubular member, the thread profile comprising:
    a first section that extends from an end of the thread profile at a first taper angle relative to a longitudinal axis of the tubular member and exhibits a first thread pitch;
    a second section extending from the first section at a second taper angle relative to the longitudinal axis and exhibits a second thread pitch; and
    a third section extending from the second section at a third taper angle relative to the longitudinal axis and exhibits a third thread pitch, wherein the second taper angle is greater than each of the first and third taper angles.

20. The thread profile of claim 19, wherein at least one of the first, second, and third thread pitches is different from at least one other of the first, second and third thread pitches.

\* \* \* \* \*